(12) United States Patent
Kirchhoff et al.

(10) Patent No.: US 8,753,003 B2
(45) Date of Patent: Jun. 17, 2014

(54) SCREW FEED ELEMENTS FOR EXTRUSION OF VISCOELASTIC MASSES

(75) Inventors: Jörg Kirchhoff, Antwerp (BE); Thomas König, Leverkusen (DE); Michael Bierdel, Leverkusen (DE); Ulrich Liesenfelder, Bergisch Gladbach (DE)

(73) Assignee: Bayer Intellectual Property GmbH, Monheim (DE)

( * ) Notice: Subject to any disclaimer, the term of this patent is extended or adjusted under 35 U.S.C. 154(b) by 81 days.

(21) Appl. No.: 13/516,055

(22) PCT Filed: Dec. 13, 2010

(86) PCT No.: PCT/EP2010/069470
§ 371 (c)(1),
(2), (4) Date: Jul. 18, 2012

(87) PCT Pub. No.: WO2011/073121
PCT Pub. Date: Jun. 23, 2011

(65) Prior Publication Data
US 2013/0033956 A1    Feb. 7, 2013

(30) Foreign Application Priority Data
Dec. 18, 2009 (DE) .................. 10 2009 059 072

(51) Int. Cl.
*B29B 7/00* (2006.01)

(52) U.S. Cl.
USPC .................................................... 366/83

(58) Field of Classification Search
CPC ............ B01F 7/00391; B01F 13/0035; B01F 7/00966
USPC ................ 366/83, 85, 86, 88, 301, 158.2
See application file for complete search history.

(56) References Cited

U.S. PATENT DOCUMENTS

| 3,254,367 | A | 6/1966 | Erdmenger |
| 8,172,450 | B2 * | 5/2012 | Blach ............................. 366/83 |
| 2011/0096617 | A1 | 4/2011 | Bierdel et al. |
| 2011/0141843 | A1 * | 6/2011 | Bierdel et al. ................ 366/301 |
| 2012/0182823 | A1 | 7/2012 | Burkhardt |

FOREIGN PATENT DOCUMENTS

| DE | 42 39 220 A1 | 5/1994 |
| DE | 10 2008 016862 A1 | 10/2009 |
| EP | 1013402 A2 | 6/2000 |
| EP | 1 757 420 A1 | 2/2007 |
| JP | 58-17825 | 2/1983 |

(Continued)

OTHER PUBLICATIONS

Kohlgrüber: Der gleichläufige Doppelschneckenextruder [the co-running twin-screw extruder], Hanser Verlag Munich 2007 (Translation).

(Continued)

*Primary Examiner* — Tony G Soohoo
*Assistant Examiner* — Anshu Bhatia
(74) *Attorney, Agent, or Firm* — Miles and Stockbridge

(57) ABSTRACT

The invention relates to novel screw feed elements for multi-shaft screw feed machines having screw feed profiles rotating in the same direction in pairs and precisely abrading in pairs, to the use of the screw elements in multi-shaft screw feeding machines and to a method for extrusion of viscoelastic masses.

19 Claims, 3 Drawing Sheets

(56) References Cited

FOREIGN PATENT DOCUMENTS

| JP | S58 17825 A | 2/1983 |
| WO | 0020189 A1 | 4/2000 |
| WO | 0209919 A2 | 2/2002 |
| WO | 02070231 A1 | 9/2002 |
| WO | 02076707 A1 | 10/2002 |
| WO | 2009/152910 | 12/2009 |
| WO | 2011039016 A1 | 4/2011 |

OTHER PUBLICATIONS

International Search Report for PCT/EP2010/069470 Mailed Oct. 26, 2011.

European Search Report for 13156356.1 Mailed May 31, 2013.

\* cited by examiner

SCREW FEED ELEMENTS FOR EXTRUSION OF VISCOELASTIC MASSES

CROSS REFERENCE TO RELATED APPLICATIONS

This application is a §371 National Stage Application of PCT/EP2010/069470, filed Dec. 13, 2010, which claims priority to German Application No. 10 2009 059 072.2, filed Dec. 18, 2009.

BACKGROUND OF THE INVENTION

1. Field of the Invention

The invention relates to novel screw elements for multi-shaft screw machines with paired co-directionally rotating and paired fully wiping screw profiles, use of the screw elements in multi-shaft screw machines and a process for the extrusion of viscoelastic compositions.

2. Description of Related Art

Co-directionally rotating twin- or possibly multi-shaft machines, the rotors of which fully wipe one another, have been known already for some considerable time. A comprehensive overview of such screw extruders is provided by the following publication [1]=Kohlgrüber: Der gleichläufige Doppelschneckenextruder [the co-running twin-screw extruder], Hanser Verlag Munich 2007.

In the publication [1], the structure, function and operation of twin- and multi-shaft extruders are particularly explained at length. The screw elements and the way in which they work is devoted a chapter of its own (pages 227-248). Here, the structure and function of conveying, kneading and mixing elements are explained in detail.

Modern screw extruders have a modular system, in which different screw elements can be drawn onto a core shaft. This allows a person skilled in the art to adapt the screw extruder to the respective process task.

When describing screw elements, the cross-sectional profile perpendicular to the axis of rotation—also referred to hereafter as profile for short—is usually considered. A pair of screw elements comprises a screw element with a generating screw profile and a screw element with a generated screw profile.

The regions of a screw profile that are equal to the outer screw radius are referred to as flight land regions. The angle between the starting point and the end point of a flight land region, with respect to the point of rotation of the screw profile, is referred to as the flight land angle. A flight land region that is in contact with the outer screw radius only at one point has the flight land angle 0—the starting point and the end point coincide at a point. The regions of a screw profile that are equal to the core radius are referred to as groove regions. The angle between the starting point and the end point of the groove region, with respect to the point of rotation of the screw profile, is referred to as the groove angle. A groove region that is in contact with the core radius only at one point has the groove angle 0—here, too, the starting point and the end point are identical. The regions of a screw profile that are smaller than the outer screw radius and larger than the core radius are referred to as flank regions. Correspondingly, the angle between the starting point and the end point of a flank region, with respect to the point of rotation of the screw profile, is referred to as the flank angle. The region of a multi-shaft extruder that is penetrated by two barrel bores is referred to as the interstitial region. The two points of intersection of two barrel bores are referred to as the barrel interstice [1].

In polymer preparation and processing, screw machines which are based on the principle of fully wiping profiles have been put to varied use. This is based in particular on the fact that polymer melts adhere to surfaces and, under customary processing temperatures, degrade over time, which is prevented by the self-cleaning effect of the fully wiping screws. Rules for producing fully wiping screw profiles are presented, for example, in publication [1], pages 96-109. Here it is also described that a given screw profile on the first shaft of a twin-screw extruder determines the screw profile on the second shaft of a twin-screw extruder. The screw profile on the first shaft of the twin-screw extruder is therefore referred to as the generating screw profile. The screw profile on the second shaft of the twin-screw extruder follows from the screw profile of the first shaft of the twin-screw extruder and is therefore referred to as the generated screw profile. In the case of a multishaft extruder, the generating screw profile and the generated screw profile are always used alternately on adjacent shafts.

Co-directionally rotating twin- or multi-shaft machines are used in particular for the extrusion of plastic compositions. A plastic composition is understood as meaning a deformable composition. Examples of plastic compositions are polymer melts, in particular thermoplastics and elastomers, mixtures of polymer melts or dispersions of polymer melts with solids, liquids and/or gases.

Extrusion is understood as meaning the treatment of a substance or substance mixture in a co-directionally rotating twin-screw or multi-shaft extruder, as extensively described in [1]. The treatment of substances during an extrusion comprises one or more of the process operations of conveying, melting, dispersing, mixing, degassing and building up pressure.

Extrusion plays a great part particularly in the preparation, compounding and processing of polymers.

In the preparation of polymers, extrusion is performed for example to degas the polymers (see for example [1] pages 191 to 212).

In the compounding of polymers, an extrusion is performed, for example, to mix in additional substances or to mix different polymers, which differ for example in chemical composition, molecular weight or molecular structure (see for example [1] pages 59 to 93). This process referred to as compounding serves for treating the polymer to prepare the finished polymer moulding compound by using the raw polymer materials, which are usually melted, and adding and mixing in fillers and/or reinforcing materials, plasticizers, coupling agents, lubricants, stabilizers, dyes, etc. Compounding often also comprises the removal of volatile constituents, such as for example air and water. The removal of the volatile constituents takes place in this case through openings in the otherwise closed screw barrels, known as the vents. Such vents may expose one or both screw shafts. Since, as is known, extruders convey by friction, at a vent the conveying performance of the extruder is reduced and the degree of filling increases at this point. Compounding may also involve a chemical reaction, such as for example grafting, modification of functional groups or modifications of the molecular weight by deliberately building up or reducing the molecular weight.

When processing polymers, the polymers are preferably brought into the form of a semifinished product, a ready-to-use product or a component. Processing may be performed, for example, by injection moulding, extrusion, film blowing, calendering or spinning. Processing may also comprise mixing polymers with fillers and auxiliary substances and additives as well as chemical modifications, such as for example vulcanization.

On page 73 et seq. in the publication [1], the conveying of the melt and the building up of the pressure are described. The melt conveying zones in extruder screws serve the purpose of transporting the product from one process zone into the next and drawing in fillers. Melt conveying zones are generally partially filled, such as for example when transporting the product from one process zone into the next, when degassing and in holding zones. The energy required for conveying is dissipated and is disadvantageously manifested as an increase in the temperature of the polymer melt. Therefore, screw elements that dissipate as little energy as possible should be used in a conveying zone. For purely conveying melt, thread elements with pitches of approximately once the inside extruder diameter are customary.

A particularly great conveying capacity is required in extruder screws at the points where a second machine that is used for supplying a partial stream of the composition to be extruded is laterally built on. A machine ideally adapted to the requirements at this point would have an increased conveying capacity in comparison with the second shaft on the shaft that has to receive the supplied partial stream. This is not the case, however, with screw profiles according to the prior art.

It is known ([1], page 106) that the conveying capacity of a twin-screw extruder is approximately proportional to the free cross-sectional area. According to the prior art, however, this free cross-sectional area is fixed for each individual element.

Upstream of pressure consumers within the extruder, such as for example backward-conveying elements, mixing elements, backward-conveying or neutral kneading blocks and upstream of pressure consumers outside the extruder, such as for example die plates, extrusion dies and melt filters, there is formed within the extruder a backpressure zone, in which conveying takes place in the fully filled state and in which the pressure for overcoming the pressure consumer must be built up. The pressure build-up zone of an extruder, in which the pressure necessary for discharging the melt is generated, is referred to as the discharge zone. Energy introduced into the polymer melt is divided into useful power for building up pressure and for conveying the melt and into dissipative power, which is disadvantageously manifested as an increase in the temperature of the melt. In the pressure build-up zone, a strong backflow of the melt via the screw flight lands takes place, and as a result an increased input of energy [1]. Therefore, screw elements that dissipate as little energy as possible should be used in a pressure build-up zone.

According to the prior art [1] (see for example page 101), the geometry of the fully wiping screw elements is fixed by specifying the independent variables of the number of flights Z, centreline distance A and outer radius RA. According to the prior art, the flight land angle in the region of which all points of the profile clean the barrel is not a variable that can be set and adapted to the task in question, but is obtained for elements with a flight land region as $$KW0 = \frac{\pi}{Z} - 2\arccos\left(\frac{A}{2 \cdot RA}\right)$$

where KW0 is the flight land angle of the fully wiping profile in radians and $\pi$ is the mathematical constant of a circle ($\pi \approx 3.14159$).

According to the prior art [1], the sum of the flight land angles over both elements of a closely meshing pair of elements SKW0 necessarily becomes:

$$SKW0 = 2\pi - 4Z\arccos\left(\frac{A}{2 \cdot RA}\right)$$

Screw profiles may be configured with one or more screw flights. Known screw profiles with just one screw flight are known for good conveying capacity and stiffness during the pressure build-up. They have a very wide screw flight land, which cleans off the screw barrel with a narrow gap. It is known to a person skilled in the art that, on account of the narrow gap, a particularly great amount of energy is dissipated in the melt in the region of the screw flight lands, which leads to instances of strong overheating locally in the product.

This is described, for example, in [1] on pages 160 et seq. for a double-flighted conveying element with the known Erdmenger screw profile. These instances of local overheating can lead to damage occurring in the product, such as for example changing of the odour, colour, chemical composition or molecular weight, or to the formation of inhomogeneities in the product such as gel bodies or specks. In particular, a large flight land angle is detrimental here. Furthermore, in the case of many processes, a high input of energy limits the possible throughput of the twin-screw extruder, and consequently the cost effectiveness.

In co-running twin-screw extruders according to the prior art, therefore, double-flighted screw profiles that have only a narrow screw flight land are predominantly used. However, these are considerably less effective in the pressure build-up than the single-flighted screw profiles.

It is known to a person skilled in the art ([1], pages 129 to 146) that the efficiency in the pressure build-up of double-flighted conveying elements with the known Erdmenger screw profile is approximately 10%. With said efficiency of 10%, a density of the melt of 1000 kg/m$^3$ and a thermal capacity of the melt of 2000 J/kg/K, a rise in pressure of 50 bar leads to a rise in temperature of 25 K ([1], page 120). This heating may lead to damage occurring in the product, such as for example changing of the odour, colour, chemical composition or molecular weight, or to the formation of inhomogeneities in the product such as gel bodies or specks.

Co-directionally rotating twin-screw extruders are established prior art for the processing of thermoplastic polymers. On the other hand, these machines are not yet widely used for the processing of polymers with strongly viscoelastic properties, such as for example rubbers. The viscoelastic behaviour leads to particular phenomena and problems:

The elastic properties have the effect that the products behave in a way similar to solids. Instead of a homogeneous melt, there are soft elastic particles in the partially filled zones of the screw.

These particles or "crumbs" have a low apparent density, as a result of which the volume of the screw flights in open zones of the screw is often not sufficient and the product blocks the openings (for example vents).

The elastic properties bring about a recovery, for example after passing through a gap between the screw and the barrel or in the interstitial region (similar to the "Die Swell" behaviour at a die). This has the effect that some of the particles in the partially filled screw zones are large. Large particles are unfavourable for diffusive processes such as the degassing of volatile components.

The large, recovering particles have the tendency to swell out from the screw flight in open zones of the screw (for example degassing zones) and thereby cause blockages.

The elastic properties make it more difficult to draw the particles into the screw flight or into a gap—the particles tend to move away. As a result, the conveying capacity of the screw is reduced.

The hindered drawing in of particles also reduces the mixing effects and the surface renewal in partially filled zones of the screw, resulting for example in a reduction in the degassing performance in an extruder.

In the case of many commonly used rubbers, the viscoelastic properties are accompanied by a high viscosity, which may lead to a high energy dissipation and consequently to overheating and degradation of the material.

When extruding diene rubbers, such as for example polybutadiene (BR), natural rubber (NR) and synthetic polyisoprene (IR), butyl rubber (IIR), chlorobutyl rubber (CIIR), bromobutyl rubber (BIIR), styrene-butadiene rubber (SBR), polychloroprene (CR), butadiene-acrylonitrile rubber (NBR), partially hydrogenated butadiene-acrylonitrile rubber (HNBR) and ethylene-propylene-diene copolymers (EPDM), an excessively high temperature results in gel formation by cross-linking, which leads to the impairment of mechanical properties of the components produced therefrom. In the case of chloro- and bromobutyl rubber, an elevated temperature may result in the elimination of corrosive gaseous hydrochloric or hydrobromic acid, which in turn catalyzes further decomposition of the polymer.

When extruding rubber compounds which contain vulcanizing agents, such as for example sulphur or peroxides, excessively high temperatures result in premature vulcanization. This results in it no longer being possible to produce any products from these rubber compounds.

Viscoelastic compositions accordingly impose particular requirements on the extruders.

Modern twin-screw extruders have a modular system, in which different known screw elements can be drawn onto a core shaft. This allows a person skilled in the art to adapt the twin-screw extruder to the respective process task. However, the screw elements known from the prior art are mostly not optimally designed for an actual task. Rather, the manufacturers supply screw elements (conveying, kneading and mixing elements) from a fixed modular system irrespective of an actual task.

To be able to process viscoelastic products better, adaptations of the screw fittings are required. With the standard screw elements commonly available on the market, not all process tasks can be satisfactorily accomplished.

SUMMARY

Therefore, on the basis of the prior art, the object is to provide screw elements for co-directionally rotating twin- or multi-shaft machines that make effective and efficient extrusion of viscoelastic compositions possible. The screw elements that are sought should be improved in terms of how they draw viscoelastic compositions into an extruder. The screw elements that are sought should avoid the occurrence of large particles in the extruded material. The screw elements that are sought should introduce as little energy as possible into the extruded material, in order to avoid damage in the product. The reduced input of energy should not, however, be at the expense of a lower pressure build-up.

According to the invention, this object is achieved by screw elements according to the independent claims. Preferred embodiments can be found in the dependent claims.

DETAILED DESCRIPTION OF A PREFERRED EMBODIMENT

Figure 1:
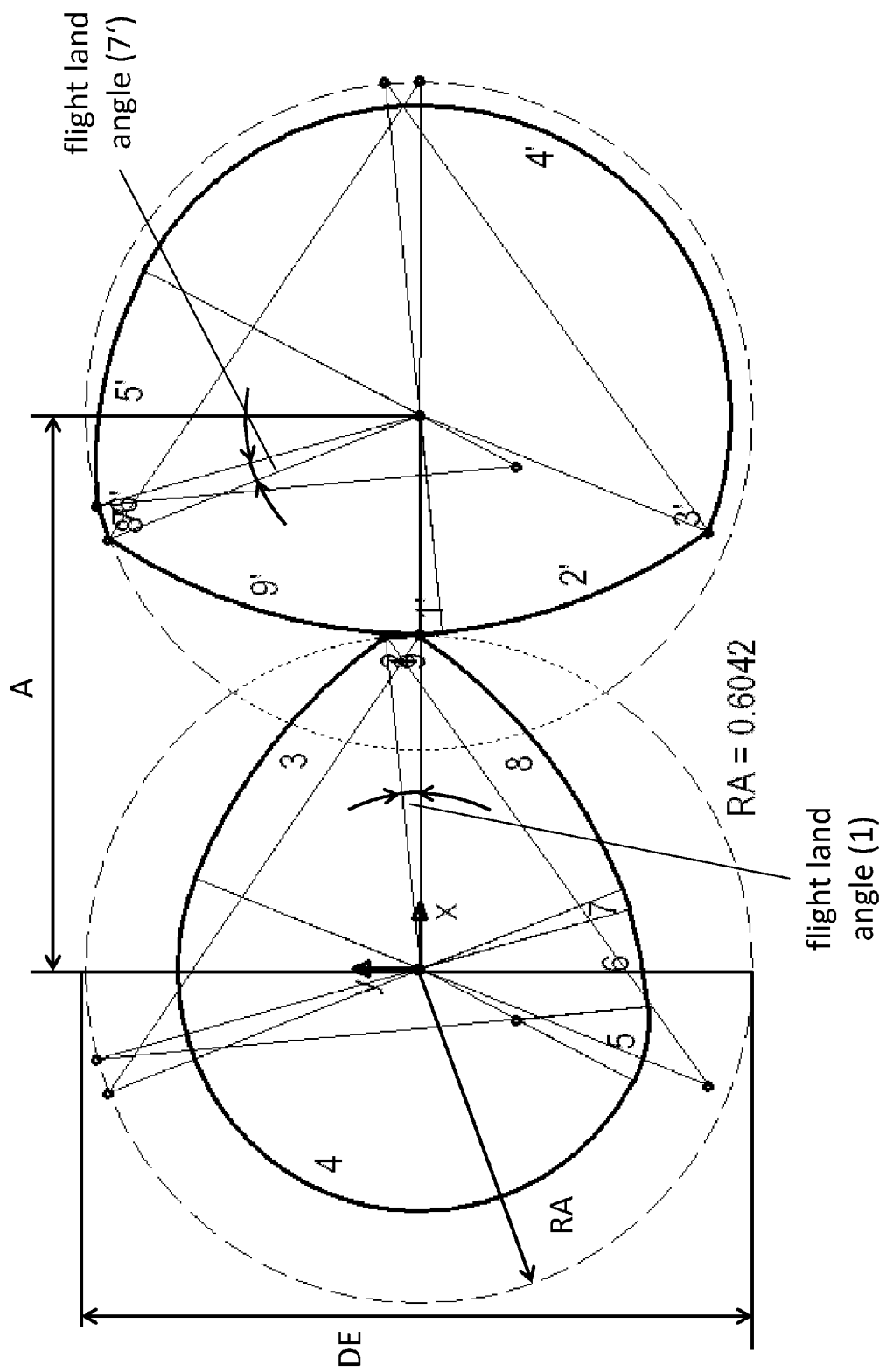
FIGS. 1-3 represent embodiments as described herein.

A profile of a screw element is understood as meaning the cross-sectional profile in a plane perpendicular to the axis of rotation.

The regions of a screw profile that are equal to the outer screw radius RA are referred to as flight land regions.

The angle between the starting point and the end point of a flight land region, with respect to the point of rotation of the screw profile, is referred to as the flight land angle.

The profile of screw elements according to the invention can be uniquely described by an arrangement of circular arcs.

The screw profiles of screw elements according to the invention are preferably made up in cross section of n arcs, where n is an integer greater than 4.

The position of each arc j (j=1 to n) can be definitively fixed by specifying two different points. The position of an arc is expediently fixed by specifying the centre point and the starting point or end point. The size of an individual arc j is fixed by the radius $R_j$ and the angle $\alpha_j$ about the centre point between the starting point and the end point, the radius $R_j$ being greater than or equal to 0 and less than or equal to the centreline distance A between the shafts, and the angle $\alpha_j$ in radians being greater than or equal to 0 and less than or equal to $2\pi$, where $\pi$ is the mathematical constant of a circle ($\pi \approx 3.14159$).

The profiles of screw elements according to the invention may also have one or more "kinks" A kink is expediently handled like an arc with a radius R=0. The "size of the kink" is given by the corresponding angle of the arc with the radius R=0, i.e. at a kink there is a transition of a first arc by rotation about the angle of a second arc with the radius R=0 into a third arc. Or to put it another way: a tangent to the first arc at the centre point of the second arc with the radius R=0 intersects a tangent to the third arc likewise at the centre point of the second arc at an angle which corresponds to the angle of the second arc. However, taking the second arc into account, all the adjacent arcs (first→second→third) merge tangentially with one another. Expediently, an arc with a radius R=0 is handled like an arc of a radius that is equal to eps, where eps is a very small positive real number that tends towards 0 (eps<<1, eps→0).

In the case of a profile according to the invention, the arcs always merge tangentially into one another at their starting points and end points.

In a twin-screw extruder, the bores overlap in cross section in what is known as the interstitial region. As is known, the free surface area in the cross section of a figure-of-eight bore of a twin-shaft extruder is:

$$F_{acht} = r^2 \cdot (2\pi - gw + \sin(gw))$$

where r is the radius, $\pi$ is the constant of a circle and gw is the barrel angle gw=2·arc cos(A/DE).

The cross-sectional area $F_{halb}$ that an element has available in principle is half the total area $$F_{halb} = F_{acht}/2$$

If the cross section of a generating screw profile takes up the area $F_1$, there remains a free cross-sectional area $F_1^{frei}$ of $$F_1^{frei} = F_{halb} - F_1$$

For the free cross-sectional area $F_2^{frei}$ of the adjacent generated screw profile it correspondingly applies that: $F_2^{frei} = F_{halb} - F_2$ The larger the free cross-sectional area is, the greater the free volume that is available to the extruded material, and the greater the conveying capacity of the extruder.

A subject of the present invention are screw elements that are distinguished by the following combination of features:

- The free volume in a screw channel is increased in comparison with the prior art, which in the case of an open barrel has favourable effects on the degassing properties. Similarly, the increased conveying capacity in the case of asymmetric screw profiles on a shaft according to the invention can be used wherever side extruders are coupled on.
- The sum of the flight land angles of a pair of elements is smaller than in the case of the screw elements known from the prior art. Consequently, screw elements according to the invention have in comparison with the prior art a smaller region with which all the points of the profile clean off the barrel. Since a particularly great amount of energy is introduced into the extruded material in this region, the screw elements according to the invention subject the extruded material to less mechanical and thermal loading, which has an effect both on the quality of the product and on the cost effectiveness of the process, since the lower loading makes it possible to increase the throughput (see for example [1] page 60). Furthermore, the sacrifices in the pressure build-up that are caused by reducing the flight land angle are small in comparison with the reduction in the thermal loading, so that a higher efficiency in the pressure build-up is achieved.
- The flight land region of one or both profiles of a pair of elements is preferably adjoined by what is known as a tapering region, which brings about a tapering flight land gap that is long in comparison with the prior art. The tapering region is characterized by a comparatively small free volume. This tapering region has the effect of reducing or even avoiding large particles when processing viscoelastic materials (reducing the "Die Swell" effect).

The features mentioned can be realized in various ways in the case of the screw elements according to the invention. For instance, it is possible to realize the large free volume in an open screw channel on one shaft, while the tapering region is realized on the adjacent shaft. Such screw elements form a first subject of the present invention. Such screw elements are also referred to hereafter as screw elements of different profiles.

It is also possible to realize the large free volume in an open screw channel and the tapering region on a single shaft. Such screw elements form a second subject of the present invention. Such screw elements are also referred to hereafter as screw elements of identical profiles.

From the screw elements of different profiles according to the invention there can be derived a third type of screw elements, which is likewise a subject of the present invention. Screw elements of this type are also referred to here as open screw elements.

Hereafter, A is the centreline distance between two screw elements, DE is the outside diameter of the screw elements, RA is the outer radius of the screw elements, RI is the inner radius of the screw elements and $\pi$ is the constant of a circle.

Screw Elements of Different Profiles

A first subject of the present invention are screw elements for multi-shaft screw machines with paired co-directionally rotating screw shafts, characterized in that adjacent screw elements have an unlike, unsymmetrical profile, the screw elements have in each case a single flight land region, the sum SKW of all the flight land angles of a pair of adjacent screw elements is greater than 0 and less than $$2\pi - 4 \cdot \arccos\left(\frac{A}{DE}\right),$$

the free cross-sectional areas $F_1^{frei}$ and $F_2^{frei}$ of adjacent screw elements differ from each other in their size.

The screw elements of different profiles according to the invention that are used on adjacent shafts have a different profile, i.e. the generating screw profile and the generated screw profile are unlike.

Furthermore, the profiles of screw elements of different profiles are unsymmetrical, i.e. they are neither mirror-symmetrical nor point-symmetrical.

The sum of the angles of all the flight land angles of the generated screw profile and the generating screw profile of screw elements of different profiles is greater than 0 and less than $$2\pi - 4 \cdot \arccos\left(\frac{A}{DE}\right),$$

preferably less than $$0.8 \cdot \left(2\pi - 4 \cdot \arccos\left(\frac{A}{DE}\right)\right),$$

particularly preferably less than $$0.6 \cdot \left(2\pi - 4 \cdot \arccos\left(\frac{A}{DE}\right)\right),$$

and most preferably less than $$0.4 \cdot \left(2\pi - 4 \cdot \arccos\left(\frac{A}{DE}\right)\right).$$

Consequently, screw elements of different profiles according to the invention have in comparison with prior-art screw elements with one flight land region each a smaller region with which all the points of the profile clean off the barrel. Since a particularly great amount of energy is introduced into the extruded material in this region, the screw elements according to the invention subject the extruded material to less mechanical and thermal loading, which has an effect both on the quality of the product and on the cost effectiveness of the process, since the lower loading makes it possible to increase the throughput (see for example [1] page 60). Furthermore, the sacrifices in the pressure build-up that are caused by reducing the flight land angle are small in comparison with the reduction in the thermal loading, so that a higher efficiency in the pressure build-up is achieved.

The ratio of the outer screw radius RA to the centreline distance A for the screw elements of different profiles preferably lies in the range from 0.51 to 0.7, particularly preferably in the range from 0.52 to 0.66 and most particularly preferably in a range from 0.57 to 0.63.

In the case of the screw elements of different profiles according to the invention, the free cross-sectional areas $F_1^{frei}$ and $F_2^{frei}$ of adjacent profiles differ from each other in their size. The ratio of the larger area to the smaller area is preferably at least 1.2, particularly at least 1.5 and most particularly preferably at least 2.

Screw elements according to the invention are also distinguished by the fact that the flight land region either of the generating screw profile or of the generated screw profile is adjoined on one side by a region which is referred to as the "tapering region".

The tapering region comprises one or more arcs, all of the points that lie on the arcs of the tapering region having a distance from the point of rotation that lies between (RA+RI)/2 and RA. The tapering region extends over an angle, with respect to the point of rotation of the profile, which is greater than 90°. The tapering region preferably extends over an angle greater than 120°, particularly preferably greater than 180°.

The tapering region adjoining the flight land region produces a long tapering flight land gap, which has the effect of reducing or even avoiding large particles when processing viscoelastic materials (reducing the "Die Swell" effect).

The large tapering region in comparison with the prior art results in a greater free volume in comparison with the prior art in an open screw channel in the profile of the adjacent screw element, which has favourable effects on the degassing properties.

Screw Elements of Identical Profiles

A second subject of the present invention are screw elements for multi-shaft screw machines with paired of co-directionally rotating screw shafts, characterized in that
  adjacent screw elements have an identical, unsymmetrical profile,
  the profile comprises a single flight land region with a flight land angle less than $$\pi - 2\arccos\left(\frac{A}{2 \cdot RA}\right),$$

and
  in the profile, the flight land region is adjoined on one side by a region which is referred to as a tapering region.

The tapering region comprises one or more arcs, all of the points that lie on the arcs having a distance from the point of rotation that lies between (RA+RI)/2 and RA. Since the generating screw profile and the generated screw profile are identical, tapering regions are present on both adjacent screw elements. The tapering region extends over an angle, with respect to the point of rotation of the profile, which is greater than 30°, preferably greater than 45° and particularly preferably greater than 90°.

The tapering region adjoining the flight land region produces a long tapering flight land gap, which has the effect of reducing or even avoiding large particles when processing viscoelastic materials (reducing the "Die Swell" effect).

The screw elements of identical profiles according to the invention that are used on adjacent shafts have an identical profile, i.e. the generating screw profile and the generated screw profile are alike.

The identicalness of the generating screw profile and the generated screw profile in combination with the large tapering region in comparison with the prior art results on the side of the screw elements that is opposite from the tapering region in a greater free volume in comparison with the prior art in an open screw channel, which has favourable effects on the conveying and degassing properties.

Furthermore, the profile of screw elements of identical profiles is unsymmetrical, i.e. it is neither axially symmetrical nor point-symmetrical.

Screw elements of identical profiles according to the invention have a single flight land region.

Screw elements of identical profiles according to the invention have a fight land angle of less than $$\pi - 2\arccos\left(\frac{A}{2 \cdot RA}\right),$$

preferably less than $$0.8 \cdot \left(\pi - 2\arccos\left(\frac{A}{2 \cdot RA}\right)\right),$$

particularly preferably less than $$0.6 \cdot \left(\pi - 2\arccos\left(\frac{A}{2 \cdot RA}\right)\right),$$

most particularly preferably less than $$0.5 \cdot \left(\pi - 2\arccos\left(\frac{A}{2 \cdot RA}\right)\right).$$

The flight land angle $$KW0 = \pi - 2\arccos\left(\frac{A}{2 \cdot RA}\right)$$

corresponds to the flight land angle of single-flighted screw elements of the Erdmenger type. Consequently, screw elements according to the invention have in comparison with the prior art a smaller region with which all the points of the profile clean off the barrel. Since a particularly great amount of energy is introduced into the extraded material in this region, the screw elements according to the invention subject the extruded material to less mechanical and thermal loading, which has an effect both on the quality of the product and on the cost effectiveness of the process, since the lower loading makes it possible to increase the throughput (see for example [1] page 60). Furthermore, the sacrifices in the pressure build-up that are caused by reducing the flight land angle are small in comparison with the reduction in the thermal loading, so that a higher efficiency in the pressure build-up is achieved.

The ratio of the outer screw radius RA to the centreline distance A for the screw elements of identical profiles preferably lies in the range from 0.51 to 0.7, particularly preferably in the range from 0.52 to 0.66 and most particularly preferably in the range from 0.57 to 0.63.

Open Screw Elements

A third subject of the present invention are screw elements for multi-shaft screw machines with paired co-directionally rotating screw shafts, characterized in that adjacent screw elements have an unlike profile,
one profile has just one flight land region and the adjacent profile has just two flight land regions,
the free cross-sectional areas $F_1^{frei}$ and $F_2^{frei}$ of adjacent profiles differ from each other in their size.

The open screw elements according to the invention that are used on adjacent shafts necessarily have a different profile, i.e. the generating screw profile and the generated screw profile are unlike.

The profiles of open screw elements may in each case be symmetrical or unsymmetrical. The profiles of generating and generated screw profiles are preferably mirror-symmetrical; they preferably have in each case a mirror plane in which the respective axis of rotation lies.

In the case of the open screw elements according to the invention, the free cross-sectional areas $F_1^{frei}$ and $F_2^{frei}$ of adjacent screw elements differ from each other in their size. The ratio of the larger area to the small area is preferably at least 1.2, particularly at least 1.4 and most particularly preferably at least 1.6.

One profile of an element of a pair of open screw elements according to the invention has just one flight land region and the other profile has just two flight land regions.

The open screw profiles according to the invention have in comparison with the prior art a smaller region with which all the points of the profile clean off the barrel. Since a particularly great amount of energy is introduced into the extruded material in this region, the screw elements according to the invention subject the extruded material to less mechanical and thermal loading, which has an effect both on the quality of the product and on the cost effectiveness of the process, since the lower loading makes it possible to increase the throughput (see for example [1] page 60). Furthermore, the sacrifices in the pressure build-up that are caused by reducing the flight land angle are small in comparison with the reduction in the thermal loading, so that a higher efficiency in the pressure build-up is achieved.

The profile of a pair of elements according to the invention that has just one flight land region is characterized by a large free volume in comparison with the prior art that has favourable effects on the degassing and conveying properties.

The ratio of the outer screw radius RA to the centreline distance A for the screw elements of identical profiles preferably lies in the range from 0.51 to 0.7, particularly preferably in the range from 0.52 to 0.66 and most particularly preferably in the range from 0.57 to 0.63.

Screw Elements of Different Profiles, Screw Elements of Identical Profiles and Open Screw Elements All of the screw elements according to the invention may be formed as conveying elements or kneading elements of mixing elements.

As is known (see for example [1], pages 227-248), a conveying element is distinguished by the fact that the screw profile is continuously turned in a helical manner and continued in the axial direction. Depending on the direction of rotation of the shafts, the conveying element is of a right-handed or left-handed configuration. Backward-conveying elements are obtained respectively by turning in the opposite direction. The pitch of the conveying element is preferably in the range of 0.1 to 10 times the centreline distance, the pitch being understood as meaning the axial length that is required for a complete rotation of the screw profile, and the axial length of a conveying element preferably lying in the range of 0.1 to 10 times the screw diameter.

As is known (see for example [1], pages 227-248), a kneading element is distinguished by the fact that the screw profile is continued in the axial direction in an offset manner in the form of kneading discs. The arrangement of the kneading discs may be right-handed or left-handed or neutral. The axial length of the kneading discs is preferably in the range of 0.05 to 10 times the centreline distance. The axial distance between two adjacent kneading discs is preferably in the range of 0.002 to 0.1 times the screw diameter.

As is known (see for example [1], pages 227-248), mixing elements are formed by conveying elements being provided with apertures in the screw flight lands. The mixing elements may be right-handed or left-handed. Their pitch preferably lies in the range of 0.1 to 10 times the centreline distance and the axial length of the elements preferably lies in the range of 0.1 to 10 times the centreline distance. The apertures preferably have the form of a u-shaped or v-shaped groove, which is preferably arranged counter-conveying or axially parallel.

The profiles of screw elements according to the invention are based on fully wiping profiles. It is known to a person skilled in the art that fully wiping screw profiles cannot be used directly in a twin-screw extruder. Rather, clearances between the screws are required. Various strategies for this are described in [1] on pages 28 et seq. For the screw profiles of screw elements according to the invention, clearances in the range from 0.001 to 0.1, with respect to the diameter of the screw profile, can be used, preferably 0.002 to 0.05 and particularly preferably 0.004 to 0.02. As known to a person skilled in the art, the clearances between the screw and the barrel and between the screw and the screw may be of different sizes or the same. The clearances may also be constant or variable, within the limits specified. It is also possible to displace a screw profile within the clearances. Possible clearance strategies are the possibilities described in [1] on pages 28 et seq. of increasing the centreline distance, the longitudinal-sectional equidistant and the spatial equidistant, which are all known to a person skilled in the art. In the case of increasing the centreline distance, a screw profile of a smaller diameter is constructed and pushed apart by the amount of clearance between the screws. In the case of the method of longitudinal-sectional equidistants, the longitudinal-sectional profile curve (parallel to the axis) is displaced inwards by half the screw-screw clearance.

In the case of the method of spatial equidistants, starting from the space curve on which the screw elements clean one another, the screw element is reduced in size by half the screw-screw clearance in the direction perpendicular to the surfaces of the fully wiping profile. The longitudinal-sectional equidistant and the spatial equidistant is preferably used, particularly preferably the spatial equidistant.

The profile of screw elements according to the invention can be constructed on the basis of one of the methods described in PCT/EP2009/003549.

As described above, the profile of screw elements according to the invention can be described by circular arcs. To generate screw elements according to the invention, arcs are therefore put together in such a way that they produce a convex profile and in each case go over tangentially into one another at their starting points and end points.

In this case, the profile may have one or more "kinks". At a kink, the adjacent arcs go over tangentially into one another if the kink is handled like an arc with a radius equal to 0 (see above).

It should also be taken into consideration that an arc of the generating screw profile in each case "corresponds" to an arc of the generated screw profile, "corresponding" being understood as meaning that the angles of corresponding arcs are of the same size,
the sum of the radii of corresponding arcs is equal to the centreline distance A,
one of the joining lines between the centre point of an arc of the generating screw profile and the end points thereof in each case runs parallel to one of the joining lines between the centre point of the corresponding arc of the generated screw profile and the end points thereof,
the directions in which the end points of an arc of the generating screw profile lie from the centre point of the arc are respectively opposite the directions in which the end points of the corresponding arc of the generated screw profile lie from the centre point of the arc of the generated screw profile,
the centre point of an arc of the generating screw profile is at a distance from the centre point of a corresponding arc of the generated screw profile that corresponds to the centreline distance,
the joining line between the centre point of an arc of the generating screw profile and the centre point of the corresponding arc of the generated screw profile is parallel to the joining line between the point of rotation of the generating screw profile and the point of rotation of the generated screw profile,
the direction in which the centre point of an arc of the generating screw profile would have to be displaced to make it coincide with the centre point of the corresponding arc of the generated screw profile is the same as the direction in which the point of rotation of the generating screw profile has to be displaced to make it coincide with the point of rotation of the generated screw profile.

The profiles of screw elements according to the invention are characterized in that they can be constructed just with a set square and a pair of compasses. For instance, the tangential transition between the jth arc and the (j+1)th arc of the generating screw profile is constructed by describing a circle with the radius $R_{j+1}$ about the end point of the jth arc and by the point of intersection of this circle that is closer to the point of rotation of the generating screw profile with the straight line defined by the centre point and the end point of the jth arc being the centre point of the (j+1)th arc. It is recommendable to carry out the method for generating screw profiles according to the invention on a computer. The dimensions of the screw elements are then in a form in which they can be passed on to a CAD milling machine for producing the corresponding screw elements Once they have been constructed, preferably on a computer while taking into consideration the aforementioned constructional features, the screw elements according to the invention can be produced for example by a milling machine. Preferred materials for producing the screw elements are steels, in particular nitriding steels, chromium steels, tool steels and special steels as well as powder-metallurgically produced metallic composite materials based on iron, nickel or cobalt.

Also a subject of the present invention is the use of the screw elements according to the invention in multi-shaft screw machines. The screw elements according to the invention are preferably used in twin-shaft screw machines. In the multi-shaft screw machines, the screw elements may take the form of kneading, mixing or conveying elements. It is similarly possible to combine kneading, conveying and mixing elements with one another in one screw machine. The screw elements according to the invention may also be combined with other screw elements that are, for example, known from the prior art.

The screw elements according to the invention are suitable for the extrusion of plastic and viscoelastic compositions, for example suspensions, pastes, glass, ceramic compositions, metals in molten form, plastics, polymer melts, polymer solutions, elastomer and rubber compositions.

A plastic composition is understood as meaning a deformable composition. Examples of plastic compositions are polymer melts, in particular thermoplastics, as well as elastomers, mixtures of polymer melts or dispersions of polymer melts with solids, liquids or gases.

Thermoplastic polymers or mixtures of polymers from the following series are preferably used: polycarbonate, polyamide, polyester, in particular polybutylene terephthalate and polyethylene terephthalate, as well as polyether, thermoplastic polyurethane, polyacetal, fluoropolymer, in particular polyvinylidene fluoride, as well as polyether sulphones, polyolefin, in particular polyethylene and polypropylene, as well as polyimide, polyacrylate, in particular poly(methyl)methacrylate, as well as polyphenylene oxide, polyphenylene sulphide, polyether ketone, polyarlyether ketone, styrene polymers, in particular polystyrene, and styrene copolymers, in particular styreneacrylonitrile copolymers and acrylonitrile-butadiene-styrene block copolymers as well as polyvinyl chloride. Blends of the listed plastics are likewise preferably used, these being understood by a person skilled in the art as a combination of two or more plastics.

Viscoelastic compositions are understood as meaning those materials and mixtures that have a time-, temperature- and frequency-dependent elasticity. The viscoelasticity is distinguished by a partially elastic, partially viscous behaviour. The material relaxes only incompletely after removal of the external force; the remaining energy is dissipated in the form of flow processes (retardation). Examples of viscoelastic materials are styrene-butadiene rubber, natural rubber, butadiene rubber, isoprene rubber, ethylene-propylene-diene rubber, ethylene-propylene rubber, butadiene-acrylonitrile rubber, hydrogenated nitrile rubber, butyl rubber, halobutyl rubber, chloroprene rubber, ethylene-vinyl acetate rubber, polyurethane rubber, thermoplastic polyurethane, gutta-percha, acrylate rubber, fluororubber, silicone rubber, sulphide rubber, chlorosulphonyl-polyethylene rubber. A combination of two or more of the listed rubbers or a combination of one or more rubber with one or more plastics is of course also possible.

The plastic or viscoelastic polymers to be extruded may be used in a pure form or as mixtures with fillers and reinforcing materials, such as in particular glass fibres, as mixtures with one another or with other polymers or as mixtures with customary polymer additives.

Additives may be introduced into the extruder as solids, liquids or solutions together with the polymer, or else at least some of the additives or all of the additives are fed to the extruder by way of a side stream.

Additives can lend a polymer various properties. They may be, for example, colourants, pigments, processing aids, fillers, antioxidants, reinforcing materials, UV absorbers and light stabilizers, metal deactivators, peroxide scavengers, basic stabilizers, nucleating agents, benzofurans and indolinones active as stabilizers or antioxidants, mould release agents, flame-retardant additives, antistatic agents, dye preparations and melt stabilizers. Examples of fillers and reinforcing materials are carbon black, glass fibres, clay, mica, graphite fibres, titanium dioxide, carbon fibres, carbon nanotubes, ionic liquids and natural fibres.

As stated above, the screw elements according to the invention are particularly suitable for the extrusion of viscoelastic compositions. A subject of the present invention is therefore also a process for the extrusion of viscoelastic compositions in a twin-screw or multi-shaft extruder using screw elements according to the invention.

The invention is explained in more detail below by way of example on the basis of the figures, without however being restricted thereto. All the figures have been generated with the aid of a computer program.

It is advisable to use dimensionless characteristic values, to make transferability to different extruder sizes easier. Suitable as a reference value for geometrical variables, such as for example lengths and radii, is the centreline distance A, since this value cannot be changed on an extruder.

The following nomenclature is used in the figures:

All dimensions are normalized to the centreline distance A. The normalized dimensions are denoted with capital letters.

Angles are stated in radians.

The profiles of the generating screw element and the generated screw element are described by circular arcs. The arcs are in each case consecutively numbered: the arcs of the generating profile bear the numbers 1, 2, 3 and so on, the arcs of the adjacent generated profile bear the numbers 1', 2', 3' and so on.

Mx and My are the x and y coordinates of the circle centre point of a profile-generating circular arc in a Cartesian system of coordinates, the origin of which is located at the point of rotation of the respective screw profile.

R is the radius normalized to the centreline distance A and α is the arc angle of the arc.

RA is the outer radius, normalized to the centreline distance A, of the screw elements.

All the figures have the same structure, which is described below. The generating screw profile is represented by the screw profile on the left. The generated screw profile is represented by the screw profile on the right. The arcs of the generating screw profile and the generated screw profile are identified by thick, solid lines, which are provided with the respective numbers of the arcs. Owing to the large number of arcs and owing to the fact that the figures were generated by means of a computer program, it may happen that the numbers of individual arcs overlap and are therefore difficult to read. In spite of the sometimes poor legibility of individual numbers, the structure of the profiles is nevertheless clear from the context in conjunction with the present description.

The centre point of the arcs are represented by small circles. The centre point of the arcs are joined by thin, continuous lines both to the starting point and to the end point of the associated arc. The outer screw radius is of the same size, or approximately the same size in each case for the generating screw profile and the generated screw profile. The outer screw radius is identified in the region of the screw barrel by a thin, dashed line, in the interstitial region by a thin, dotted line.

FIG. 1 shows the cross-sectional profile of a pair of screw elements of different profiles according to the invention. The generating profile and the generated profile are in each case made up of 9 circular arcs. The circular arcs 1 and 1', 2 and 2', 3 and 3' and so on respectively correspond to one another.

The profiles of the adjacent elements are different. The profiles are not symmetrical. On the left side, there is a large free cross-sectional area, on the right side a tapering region extending over the arcs 5', 4' and 3'.

TABLE 1 coordinates of the centre point of the respective arcs, their radii and the angles of the respective arcs in FIG. 1

| | | | | | | |
|---|---|---|---|---|---|---|
| 1) | R = 0.6042 | Mx = 0.0000 | 1') | R = 0.3958 | Mx = 1.0000 | |
| | α = 0.1047 | My = 0.0000 | | α = 0.1047 | My = −0.0000 | |
| 2) | R = 0.0000 | Mx = 0.6009 | 2') | R = 1.0000 | Mx = 1.6009 | |
| | α = 0.5200 | My = 0.0632 | | α = 0.5200 | My = 0.0632 | |
| 3) | R = 1.0000 | Mx = −0.2103 | 3') | R = 0.0000 | Mx = 0.7897 | |
| | α = 0.5630 | My = −0.5217 | | α = 0.5630 | My = −0.5217 | |
| 4) | R = 0.4375 | Mx = 0.0000 | 4') | R = 0.5625 | Mx = 1.0000 | |
| | α = 3.0424 | My = −0.0000 | | α = 3.0424 | My = −0.0000 | |
| 5) | R = 0.2399 | Mx = −0.0917 | 5') | R = 0.7601 | Mx = 0.9083 | |
| | α = 0.5768 | My = −0.1751 | | α = 0.5768 | My = −0.1751 | |
| 6) | R = 1.0000 | Mx = −0.1634 | 6') | R = 0.0000 | Mx = 0.8366 | |
| | α = 0.1794 | My = 0.5817 | | α = 0.1794 | My = 0.5817 | |
| 7) | R = 0.3958 | Mx = 0.0000 | 7') | R = 0.6042 | Mx = 1.0000 | |
| | α = 0.1047 | My = −0.0000 | | α = 0.1047 | My = −0.0000 | |
| 8) | R = 1.0000 | Mx = −0.2233 | 8') | R = 0.0000 | Mx = 0.7767 | |
| | α = 0.5960 | My = 0.5614 | | α = 0.5960 | My = 0.5614 | |
| 9) | R = 0.0000 | Mx = 0.6042 | 9') | R = 1.0000 | Mx = 1.6042 | |
| | α = 0.5960 | My = −0.0002 | | α = 0.5960 | My = −0.0002 | |

The coordinates of the centre point of the respective arcs, their radii and the angles of the respective arcs in FIG. 1 are specified in Table 1.

The free cross-sectional areas of adjacent elements are different. In the present example, the following applies:

$$F_{halb} = F_{acht}/2 = 2531.5$$

$$F_1 = 1482.5$$

$$F_2 = 2010.5$$

$$F_1^{frei} = 1048.7$$

$$F_2^{frei} = 521.0$$

$$\frac{F_1^{frei}}{F_2^{frei}} = 2.01$$

Figure 2:
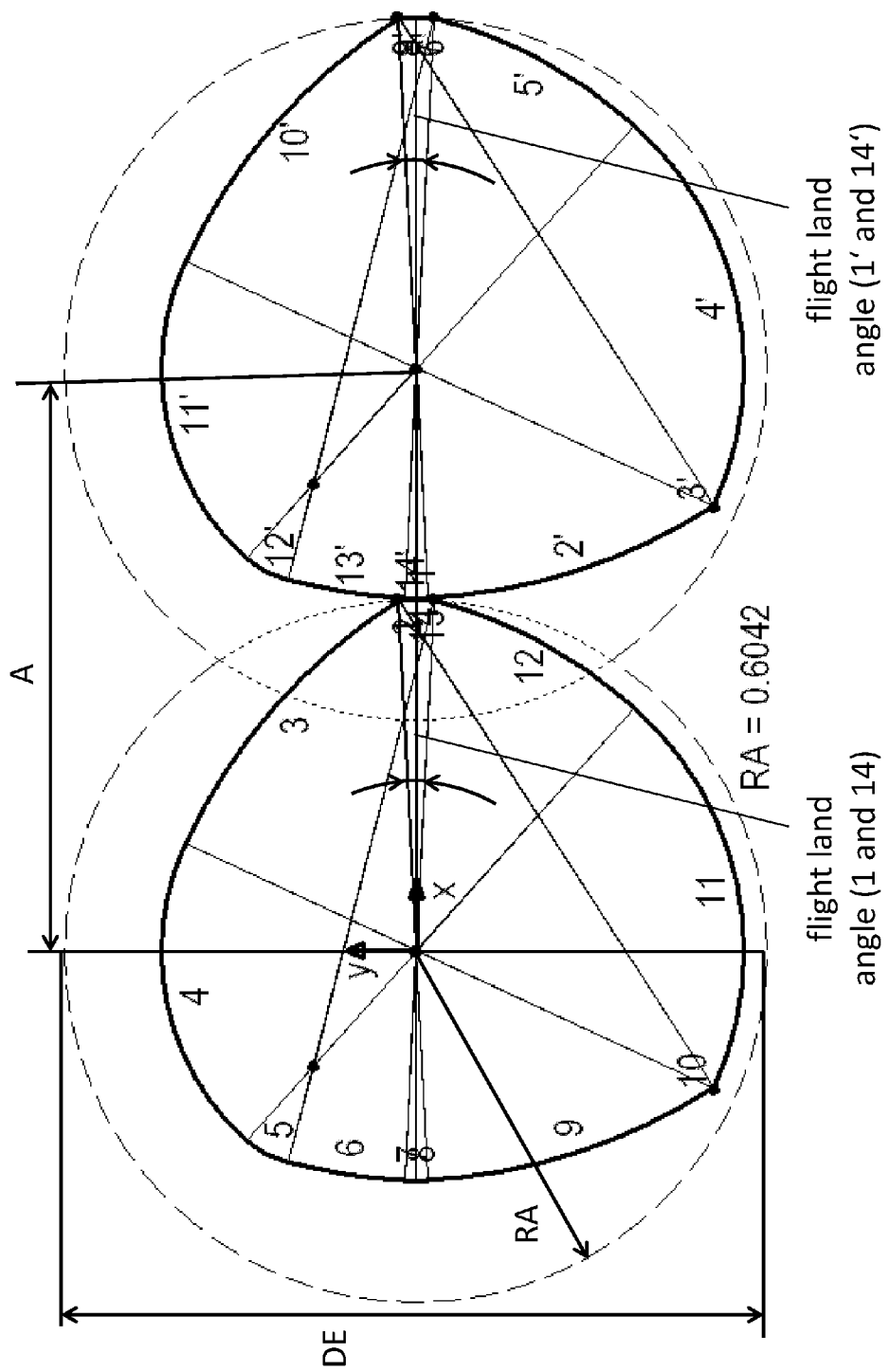

FIG. 2 shows the cross-sectional profiles of a pair of screw elements of identical profiles according to the invention. The generating profile and the generated profile are in each case made up of 14 circular arcs. The arcs 1 and 1', 2 and 2', 3 and 3' and so on respectively correspond to one another.

The profiles of the adjacent elements are identical. The profiles are not symmetrical. Each profile has a large tapering region (arcs 12, 11 and 10 or 5' and 4' and 3') and has on the opposite side of the profile a large free cross-sectional area.

TABLE 2 coordinates of the centre point of the respective arcs, their radii and the angles of the respective arcs in FIG. 2

| | | | | | |
|---|---|---|---|---|---|
| 1) | R = 0.6042 | Mx = 0.0000 | 1') | R = 0.3958 | Mx = 1.0000 |
| | α = 0.0524 | My = 0.0000 | | α = 0.0524 | My = −0.0000 |
| 2) | R = 0.0000 | Mx = 0.6033 | 2') | R = 1.0000 | Mx = 1.6033 |
| | α = 0.5200 | My = 0.0316 | | α = 0.5200 | My = 0.0316 |
| 3) | R = 1.0000 | Mx = −0.2373 | 3') | R = 0.0000 | Mx = 0.7627 |
| | α = 0.5830 | My = −0.5100 | | α = 0.5630 | My = −0.5100 |
| 4) | R = 0.4375 | Mx = 0.0000 | 4') | R = 0.5825 | Mx = 1.0000 |
| | α = 1.2765 | My = −0.0000 | | α = 1.2765 | My = −0.0000 |
| 5) | R = 0.1725 | Mx = −0.1975 | 5') | R = 0.8275 | Mx = 0.8025 |
| | α = 0.4753 | My = 0.1767 | | α = 0.4753 | My = 0.1767 |
| 6) | R = 1.0000 | Mx = 0.6033 | 6') | R = 0.0000 | Mx = 1.6033 |
| | α = 0.2020 | My = −0.0316 | | α = 0.2020 | My = −0.0316 |
| 7) | R = 0.3958 | Mx = 0.0000 | 7') | R = 0.6042 | Mx = 1.0000 |
| | α = 0.0525 | My = 0.0001 | | α = 0.0525 | My = 0.0001 |
| 8) | R = 0.3958 | Mx = 0.0000 | 8') | R = 0.5042 | Mx = 1.0000 |
| | α = 0.0524 | My = 0.0001 | | α = 0.0524 | My = 0.0001 |

TABLE 2-continued coordinates of the centre point of the respective arcs,
their radii and the angles of the respective arcs in FIG. 2

| | | | | | | |
|---|---|---|---|---|---|---|
| 9) | R = 1.0000 | Mx = 0.6033 | 9') | R = 0.0000 | Mx = 1.6033 | |
| | α = 0.5200 | My = 0.0317 | | α = 0.5200 | My = 0.0317 | |
| 10) | R = 0.0000 | Mx = −0.2373 | 10') | R = 1.0000 | Mx = 0.7627 | |
| | α = 0.5630 | My = −0.5099 | | α = 0.5630 | My = −0.5099 | |
| 11) | R = 0.5625 | Mx = 0.0000 | 11') | R = 0.4375 | Mx = 1.0000 | |
| | α = 1.2765 | My = 0.0001 | | α = 1.2765 | My = 0.0001 | |
| 12) | R = 0.8275 | Mx = −0.1975 | 12') | R = 0.1725 | Mx = 0.8025 | |
| | α = 0.4753 | My = 0.1767 | | α = 0.4753 | My = 0.1767 | |
| 13) | R = 0.0000 | Mx = 0.6033 | 13') | R = 1.0000 | Mx = 1.6033 | |
| | α = 0.2020 | My = −0.0316 | | α = 0.2020 | My = −0.0316 | |
| 14) | R = 0.6042 | Mx = 0.0000 | 14') | R = 0.3958 | Mx = 1.0000 | |
| | α = 0.0525 | My = 0.0001 | | α = 0.0525 | My = 0.0001 | |

The coordinates of the centre point of the respective arcs, their radii and the angles of the respective arcs in FIG. 2 are specified in Table 2.

Figure 3:
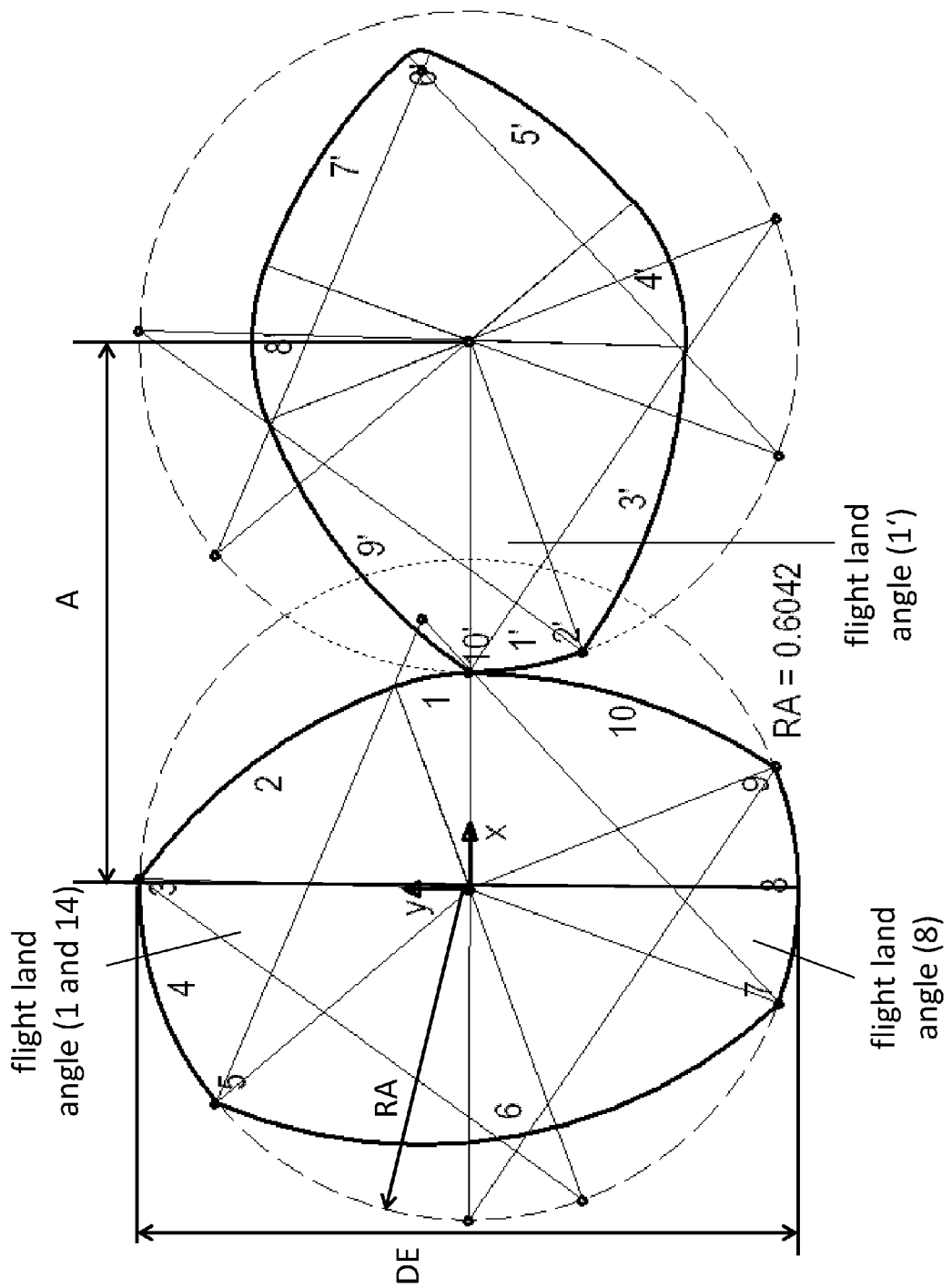

FIG. 3 shows the cross-sectional profiles of a pair of open screw elements according to the invention. The generating profile and the generated profile are in each case made up of 10 circular arcs. The arcs 1 and 1', 2 and 2', 3 and 3' and so on respectively correspond to one another.

The profiles of the adjacent elements are different. The profiles are in each case symmetrical, they have a mirror plane. The generating profile on the left has just two flight land regions (arcs 3, 4 and 5; arcs 7, 8 and 9); the generated profile on the right has just one flight land region (arcs 2', 1' and 10').

TABLE 3 coordinates of the centre point of the respective arcs,
their radii and the angles of the respective arcs in FIG. 3

| | | | | | |
|---|---|---|---|---|---|
| 1) | R = 0.3958 | Mx = 0.0000 | 1') | R = 0.6042 | Mx = 1.0000 |
| | α = 0.3491 | My = 0.0000 | | α = 0.3491 | My = −0.0000 |
| 2) | R = 1.0000 | Mx = −0.5677 | 2') | R = 0.0000 | Mx = 0.4323 |
| | α = 0.5960 | My = −0.2066 | | α = 0.5960 | My = −0.2066 |
| 3) | R = 0.0000 | Mx = 0.0180 | 3') | R = 1.0000 | Mx = 1.0180 |
| | α = 0.5960 | My = 0.6039 | | α = 0.5960 | My = 0.6039 |
| 4) | R = 0.6042 | Mx = −0.0000 | 4') | R = 0.3958 | Mx = 1.0000 |
| | α = 0.7302 | My = −0.0000 | | α = 0.7302 | My = −0.0000 |
| 5) | R = 0.0000 | Mx = −0.3894 | 5') | R = 1.0000 | Mx = 0.6106 |
| | α = 0.4681 | My = 0.4619 | | α = 0.4681 | My = 0.4619 |
| 6) | R = 0.9583 | Mx = 0.4924 | 6') | R = 0.0417 | Mx = 1.4924 |
| | α = 1.1532 | My = 0.0867 | | α = 1.1532 | My = 0.0867 |
| 7) | R = 0.0000 | Mx = −0.2081 | 7') | R = 1.0000 | Mx = 0.7919 |
| | α = 0.4681 | My = −0.5672 | | α = 0.4681 | My = −0.5672 |
| 8) | R = 0.6042 | Mx = −0.0000 | 8') | R = 0.3958 | Mx = 1.0000 |
| | α = 0.7302 | My = 0.0000 | | α = 0.7302 | My = 0.0000 |
| 9) | R = 0.0000 | Mx = 0.2232 | 9') | R = 1.0000 | Mx = 1.2232 |
| | α = 0.5960 | My = −0.5614 | | α = 0.5960 | My = −0.5614 |
| 10) | R = 1.0000 | Mx = −0.6042 | 10') | R = 0.0000 | Mx = 0.3958 |
| | α = 0.5960 | My = 0.0002 | | α = 0.5960 | My = 0.0002 |

The coordinates of the centre point of the respective arcs, their radii and the angles of the respective arcs in FIG. 3 are specified in Table 3.

The free cross-sectional areas of adjacent elements are different. In the present example, the following applies:

$$F_{halb} = F_{acht}/2 = 2531.5$$

$$F_1 = 1887.1$$

$$F_2 = 1481.1$$

$$F_1^{frei} = 644.4$$

$$F_2^{frei} = 1050.4$$

$$\frac{F_2^{frei}}{F_1^{frei}} = 1.63$$

The invention claimed is:

1. Screw elements for a multi-shaft screw machine with a paired co-directionally rotating screw shafts, wherein:
   adjacent screw elements have an unlike, unsymmetrical profile,
   said screw elements having a single flight land region,
   a sum of all flight land angles of an adjacent pair of screw feed elements is greater than 0 and less than $$2\pi - 4 \cdot \arccos\left(\frac{A}{DE}\right),$$

wherein A is the centreline distance between two screw elements, DE is the outside diameter of the screw elements, and π is the constant of a circle,
   free cross-sectional areas $F_1^{frei}$ and $F_2^{frei}$ of profiles of adjacent screw elements differ from each other in size.

2. The screw elements according to claim 1, wherein the sum of the flight land angles of a generated screw profile and a generating screw profile is less than $$0.8 \cdot \left(2\pi - 4 \cdot \arccos\left(\frac{A}{DE}\right)\right).$$

3. The screw elements according to claim 1, wherein a ratio of a larger free cross-sectional area to a smaller free cross-sectional area of adjacent profiles is at least 1.2.

4. The screw elements according to claim 1, wherein a profile of one element of a pair of elements has a tapering region which extends over an angle, with respect to a point of rotation of the profile, which is greater than 90°, the tapering region comprising one or more circular arcs, and all points that lie on the arcs of the tapering region have a distance from a point of rotation of a profile that lies from (RA+RI)/2 to RA, RA being an outer screw radius and RI an inner screw radius.

5. Screw elements for a multi-shaft screw machine with paired co-directionally rotating screw shafts, wherein:
   adjacent screw elements have an identical, unsymmetrical profile,
   the profile comprises a single flight land region with a flight land angle less than $$\pi - 2\arccos\left(\frac{A}{2 \cdot RA}\right),$$

and
   in the profile, the flight land region is adjoined on one side by a tapering region, which comprises one or more circular arcs, all points that lie on the arcs of the tapering region have a distance from a point of rotation of the profile that lies from (RA+RI)/2 to RA, A being a centreline distance, RA an outer screw radius, RI an inner screw radius and π the mathematical constant of a circle.

6. The screw elements according to claim 5, wherein the land flight angle is less than $$0.8 \cdot \left(\pi - 2\arccos\left(\frac{A}{2 \cdot RA}\right)\right).$$

7. The screw elements according to claim 5, wherein the tapering region extends over an angle, with respect to the point of rotation of the profile, which is greater than 30°.

8. Screw elements for a multi-shaft screw machine with paired co-directionally rotating screw shafts, wherein:
adjacent screw elements have an unlike profile,
in the case of an adjacent pair of screw elements, one profile has just one flight land region and an adjacent profile has just two flight land regions,
free cross-sectional areas $F_1^{frei}$ and $F_2^{frei}$ of adjacent profiles differ from each other in size.

9. The screw elements according to claim 8, wherein a ratio of a larger free cross-sectional area to a smaller free cross-sectional area of adjacent profiles is at least 1.2.

10. The screw elements according to claim 8, wherein the profiles are in each case mirror-symmetrical.

11. The screw elements according to claim 1, wherein a ratio of an outer screw radius RA to the centreline distance A lies in a range from 0.51 to 0.7.

12. The screw elements according to claim 1, which are derived from fully wiping profiles by having clearances between screw elements and a barrel and/or between adjacent screw feed elements.

13. The screw elements according to claim 1, capable of being used in a multi-shaft screw machine.

14. A process for extrusion of viscoelastic masses in a twin-screw or multi-shaft extruder using the screw elements according to claim 1.

15. The screw elements according to claim 1, wherein the sum of the flight land angles of a generated screw profile and a generating screw profile is less than $$0.6 \cdot \left(2\pi - 4 \cdot \arccos\left(\frac{A}{DE}\right)\right).$$

16. The screw elements according to claim 1, wherein a ratio of a larger free cross-sectional area to a smaller free cross-sectional area of adjacent profiles is at least 1.5.

17. The screw elements according to claim 5, wherein the land flight angle is less than $$0.6 \cdot \left(\pi - 2\arccos\left(\frac{A}{2 \cdot RA}\right)\right).$$

18. The screw elements according to claim 8, wherein a ratio of a larger free cross-sectional area to a smaller free cross-sectional area of adjacent profiles is at least 1.4.

19. The screw elements according to claim 1, wherein a ratio of an outer screw radius RA to the centreline distance A lies in a range from 0.52 to 0.66.

* * * * *